United States Patent [19]

Morimoto

[11] Patent Number: 6,022,653
[45] Date of Patent: Feb. 8, 2000

[54] COLOR IMAGE RECORDING SYSTEM AND METHOD TO PREVENT COLOR DISPLACEMENT THROUGH RED LIGHT BEAM DETECTION

[75] Inventor: Yoshinori Morimoto, Kanagawa-ken, Japan

[73] Assignee: Fuji Photo Film Co., Ltd., Kanagawa, Japan

[21] Appl. No.: 09/137,814

[22] Filed: Aug. 21, 1998

[30] Foreign Application Priority Data

Aug. 21, 1997 [JP] Japan .................................... 9-224529

[51] Int. Cl.⁷ ........................................................ G03F 9/00
[52] U.S. Cl. ............................ 430/30; 430/293; 347/232; 399/178
[58] Field of Search ............................. 430/30, 292, 293; 399/178; 347/232

[56] References Cited

U.S. PATENT DOCUMENTS 4,862,196  8/1989  Umeda et al. ........................ 347/232

*Primary Examiner*—Christopher G. Young

[57] ABSTRACT

In a color image recording system, a color image is recorded on a photosensitive material by causing red, green and blue light beams modulated according to a color image signal to scan the photosensitive material one after another in the order of the red, green and blue light beams, respectively. A photodetector detects only the red light beam, and the red, green and blue light beams are caused to start recording the colorings at respective predetermined times T1, T2 and T3 (T1<T2<T3) after the photodetector detects the red light beam.

12 Claims, 6 Drawing Sheets

COLOR IMAGE RECORDING SYSTEM AND METHOD TO PREVENT COLOR DISPLACEMENT THROUGH RED LIGHT BEAM DETECTION

BACKGROUND OF THE INVENTION

1. Field of the Invention

This invention relates to a color image recording system, and more particularly to a color image recording system in which occurrence of color displacement is prevented.

2. Description of the Related Art

As disclosed, for instance, in Japanese Unexamined Patent Publication No. 3(1991)-41871, there has been known a color image recording system in which three color beams are respectively modulated according to an image signal and caused to scan a photosensitive material, thereby recording a color image on the photosensitive material.

In such a color image recording system, the three color light beams are combined together and caused to scan the photosensitive material so that they simultaneously impinge upon the same point on the photosensitive material for each pixel, or caused to scan the photosensitive material so that they impinge upon the same point on the photosensitive material for each pixel one after another. In either case, the three color light beams modulated according to an image signal component for each pixel should impinge upon the photosensitive material at the same point for each pixel. However for various reasons including electrical and optical reasons, the three color light beams cannot impinge upon the photosensitive material accurately at the same point, which causes color displacement in the recorded color image.

In Japanese Patent Publication No. 5(1993)-29188, there is disclosed a color image recording system in which occurrence of color displacement is prevented. The color image recording system is one in which the three color light beams are caused to scan the photosensitive material one after another. In the color image recording system, a single photodetector which detects all the three color beams is provided, and recording by the three (first to third) color beams are initiated predetermined times t1, t2 and t3 after detection of the first to third color beams, respectively.

In the color image recording system, by properly setting the predetermined times t1, t2 and t3, the recording start points of the first to third color beams can be properly adjusted, whereby occurrence of color displacement can be prevented.

However in the arrangement described above, since all the color beams, e.g., R (red), G (green) and B (blue) beams, are detected by a single photodetector, there is required a complicated circuit for separating a detecting pulse for each color beam from a signal in which detecting pulses for the three colors are mixed. Since the intensities of the three color beams greatly differ from each other, the circuit must be wide in the detecting range.

This problem is due to spectral sensitivities of the color photosensitive material and the photodetector. That is, as shown in FIG. 6, the sensitivity of a typical color photosensitive material to R, G and B light beams increases in this order and accordingly the intensities of the recording light beams for a given density should be set to decrease in this order. Further the sensitivity of a typical photodetector such as of silicon decreases in this order as shown in FIG. 7 and accordingly the detecting signal output from the photodetector for a given intensity of the light is at a higher level for a R light beam and is at a lower level for a B light beam.

SUMMARY OF THE INVENTION

In view of the foregoing observations and description, the primary object of the present invention is to provide a color image recording system in which occurrence of color displacement can be prevented by a relatively simple structure.

In accordance with the present invention, there is provided a color image recording system in which a color image is recorded on a photosensitive material by causing first to third color light beams modulated according to a color image signal to scan the photosensitive material one after another in the order of the first to third color light beams, wherein the improvement comprises, a photodetector which detects only the first color light beam, and a starting point control means which causes the first to third color light beams to start recording of the image at respectively predetermined times T1, T2 and T3 (T1<T2<T3) after receipt of a beam detection signal from the photodetector.

When the first to third color light beams are R, G and B light beams, it is preferred that the first color light beam be a R light beam.

Further it is preferred that the starting point control means be able to change the predetermined times T1, T2 and T3.

In the color image recording system of the present invention, since only the first color light beam is detected by the photodetector for starting point control, no complicated circuit for separating a detecting pulse for each color beam from the detecting signal is necessary and the detecting circuit may be relatively narrow in the detecting range corresponding only the intensity range of the first color light beam, whereby color displacement can be prevented by an arrangement which is simple in structure and can be manufactured at low cost.

When the first to third color light beams are R, G and B light beams, the intensity of the R light beam is set highest, as described above, so long as a typical color photosensitive material is employed. Further, the major photodetectors are most sensitive to the R light beam. Accordingly when the R light beam is employed as the first color light beam to be detected by the photodetector, a beam detecting signal high in the S/N ratio can be obtained.

Further when the predetermined times T1, T2 and T3 are variable, the starting points for the respective color light beams can be strictly adjusted on the basis of color displacement on the actually recorded color image and occurrence of color displacement due to change with time of the system can be dealt with.

DESCRIPTION OF THE PREFERRED EMBODIMENTS

Figure 1:
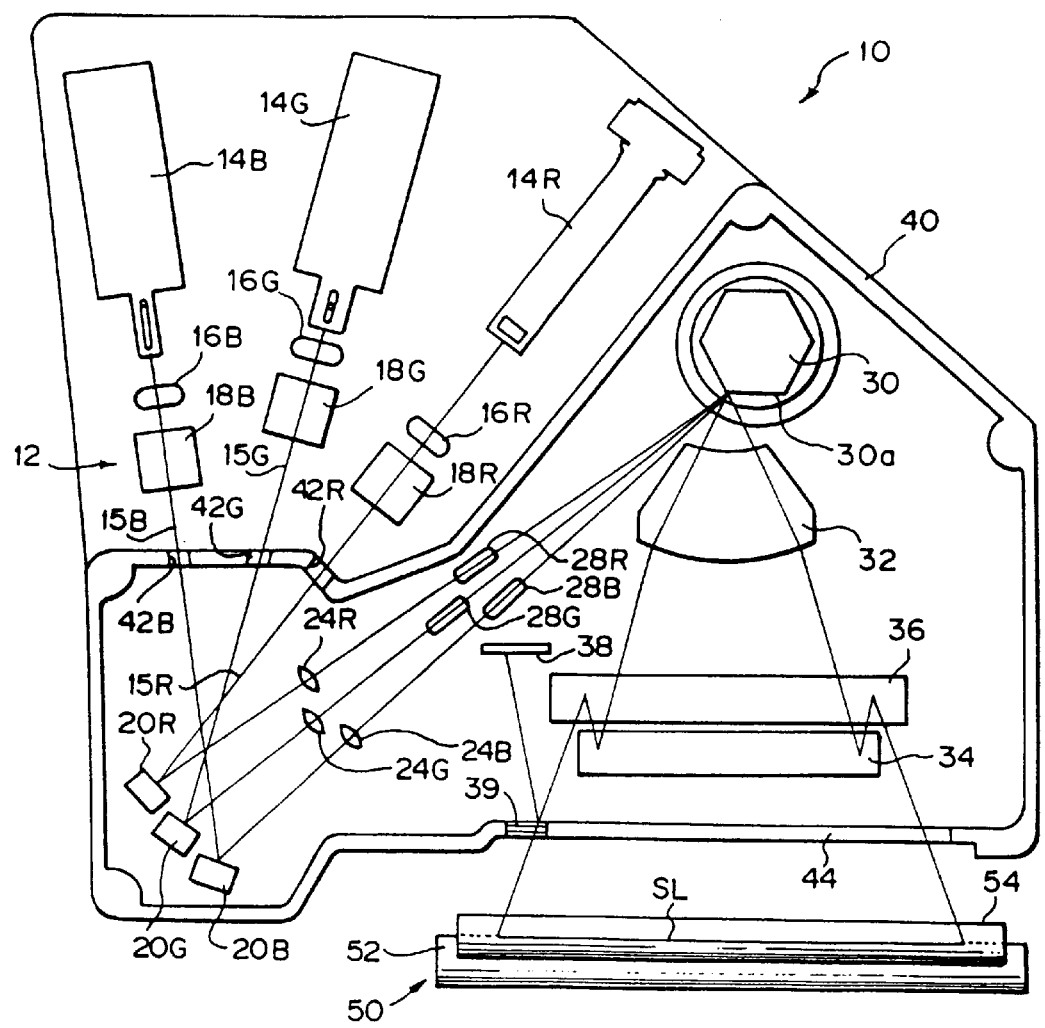
FIG. 1 is a schematic plan view of a color image recording system in accordance with an embodiment of the present invention.
Figure 2:
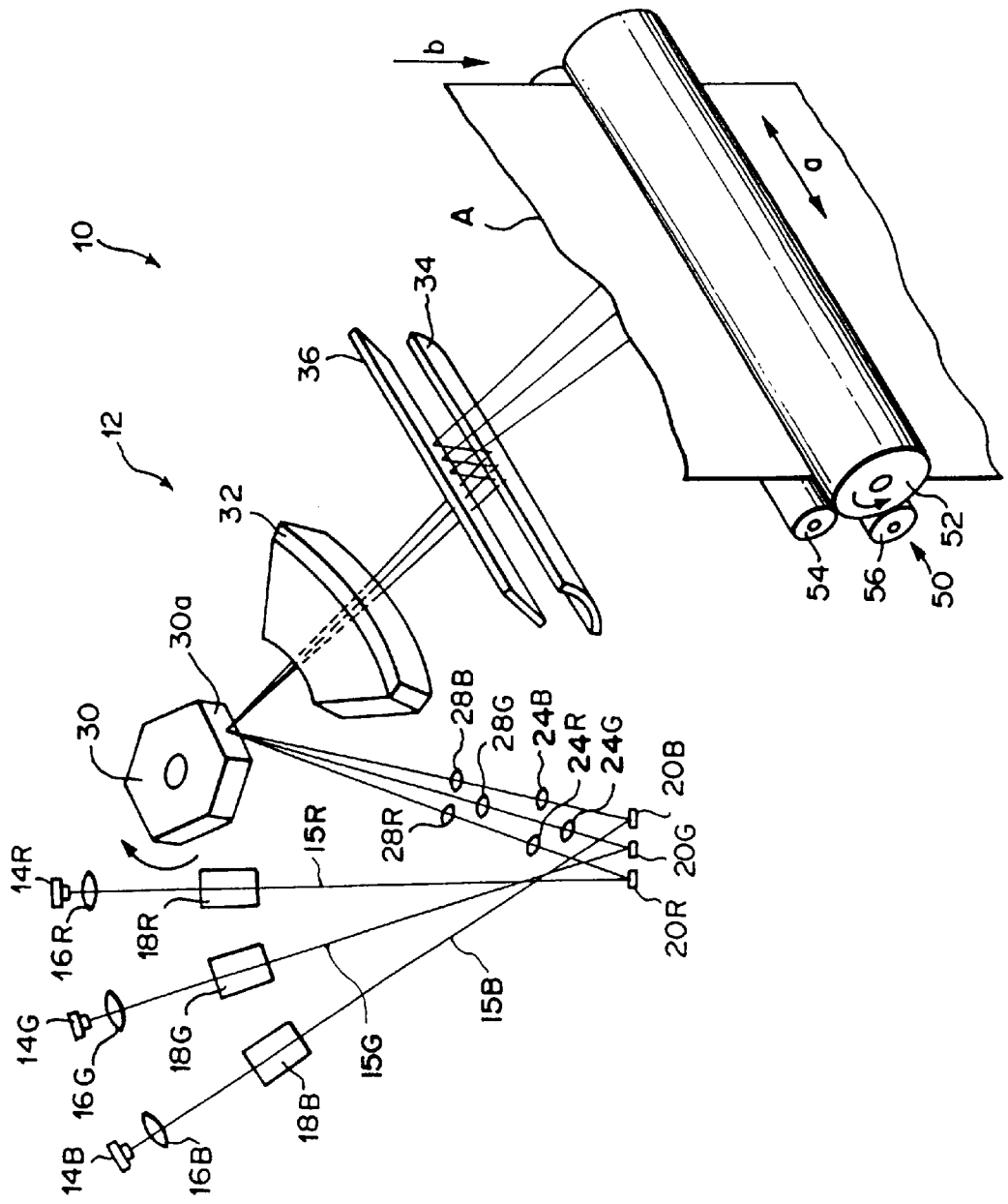
FIG. 2 is a schematic perspective view showing the optical system and the conveyer means for sub-scanning employed in the color image recording system.

In FIGS. 1 and 2, an exposure optical system 10 comprises a main scanning section 12 consisting of a plurality of optical elements, a closed housing 40 which contains a part of the optical elements in a state isolated from the environment, and a sub-scanning section 50 which conveys a photosensitive material A in a continuous length, which is scanned by three color beams (to be described later) in a main scanning direction (in the direction of arrow a in FIG. 2), in a sub-scanning direction (the direction of arrow k) substantially perpendicular to the main scanning direction.

In the exposure optical system 10, the main scanning section 12 causes light beams of three primary colors modulated according to an image to be recorded to scan the photosensitive material A in the main scanning direction while the sub-scanning section 50 conveys the photosensitive material A in the sub-scanning direction substantially perpendicular to the main scanning direction, whereby the photosensitive material A is two-dimensionally scanned by the light beams and a latent image is recorded on the photosensitive material A.

The main scanning section 12 comprises a semiconductor laser 14R which emits a red laser beam 15R, a wavelength conversion laser (a second harmonic generation laser) 14G which emits a green laser beam 15G and a wavelength conversion laser (a second harmonic generation laser) 14B which emits a blue laser beam 15B.

The main scanning section 12 further comprises collimator lenses 16R, 16G, and 16B, acoustooptic modulators (AOM) 18R, 18G and 18B, reflecting mirrors 20R, 20G and 20B, spherical lenses 24R, 24G and 24B, a rotary polygonal mirror 30, an fθ lens 32, a cylindrical mirror 34 and a reflecting mirror 36 arranged along the paths of travel of the laser beams 15R, 15G and 15B emitted from the lasers 14R, 14G and 14B.

In the main scanning section 12, the red, green and blue laser beams 15R, 15G and 15B impinge upon a reflecting surface 30a of the rotary polygonal mirror 30 at angles different from each other (e.g., by 4°) without being combined into a single light beam and are reflected by the reflecting mirror 36 to scan the photosensitive material A along a main scanning line SL (FIG. 1) while the photosensitive material A is being conveyed by the sub-scanning section 50. The photosensitive material A exhibits a wavelength-dependent sensitivity and has peaks of sensitivity for the three primary colors in a visible region.

In this particular embodiment, the red laser beam 15R is at a wavelength of about 680 nm, the green laser beam 15G is at a wavelength of about 532 nm and the blue laser beam 15B is at a wavelength of about 473 nm.

The collimator lenses 16R, 16G and 16B shape the laser beams 15R, 15G and 15B to form beam waists respectively at the acoustooptic modulators 18R, 18G and 18B.

The reflecting mirrors 20R, 20G and 20B reflect the laser beams 15R, 15G and 15B to impinge upon the reflecting surface 30a of the rotary polygonal mirror 30 at a point or points closed to each other. The spherical lenses 24R, 24G and 24B converge the laser beams 15R, 15G and 15B, which diverge from their beam waists at the acoustooptic modulators 18R, 18G and 18B, to parallel beams. The cylindrical lenses 28R, 28G and 28B adjust the diameters of the beams in the sub-scanning direction and form a surface tilt compensation optical system for compensating for tilt of the reflecting surfaces of the polygonal mirror 30 together with the fθ lens 32 and the cylindrical mirror 34.

The rotary polygonal mirror 30 deflects the modulated laser beams 15R, 15G and 15B to scan the photosensitive material A along the main scanning line SL.

The lasers 14R, 14G and 14B are disposed so that the laser beams 15R, 15G and 15B impinge upon a reflecting surface 30a of the polygonal mirror 30 at angles slightly different from each other and are reflected by the surface 30a to form images on the main scanning line SL at different angles and to scan the same main scanning line SL one after another at certain time intervals.

The fθ lens 32 is for correctly imaging the laser beams 15R, 15G and 15B in any position on the main scanning line SL and has been corrected so that the color aberrations to wavelengths of 473 nm, 532 nm and 680 nm are in an acceptable range.

The cylindrical mirror 34 forms the surface tilt compensation optical system together with the cylindrical lenses 28R, 28G and 28B and the fθ lens 32 and at the same time reflects the laser beams 15R, 15G and 15B toward the reflecting mirror 36. The reflecting mirror 36 reflects again the laser beams 15R, 15G and 15B toward the photosensitive material A conveyed by the sub-scanning section 50 in the sub-scanning direction.

A starting point sensor 38 which detects a starting point for one scanning line is disposed near the cylindrical lens 28B and a starting point mirror 39 which reflects at least one of the laser beams 15R, 15G and 15B, which impinges upon the photosensitive material A first of the three laser beams 15R, 15G and 15B, toward the starting point sensor 38 at its starting point is disposed on the inner side of the housing 40 near a light outlet window 44.

In the exposure optical system 10, a part of the optical elements of the main scanning section 12, that is, the reflecting mirrors 20R, 20G and 20B, the cylindrical lenses 28R, 28G and 28B, the polygonal mirror 30, the fθ lens 32, the cylindrical mirror 34 and the reflecting mirror 36, are contained in the housing 40, which forms a base, and fixed in respective predetermined positions.

The lasers 14R, 14G and 14B, the collimator lenses 16R, 16G and 16B, and the AOMs 18R, 18G and 18B are disposed outside the housing 40.

The housing 40 is of a desired volume and a desired shape so that the inner space can be isolated from the environment in order to avoid influence of the environmental light, dust and the like. In this embodiment, for instance, a lid is removably mounted on the housing 40. The housing 40 may be of a known material suitable for optical systems such as aluminum or synthetic resin and may be formed by various known methods such as forging, pressing, injection molding and the like. The laser beams 15R, 15G and 15B modulated by the AOMs 18R, 18G and 18B outside the housing 40 enter the housing 40 through light inlet windows 42R, 42G and 42B and impinge upon the reflecting mirrors 20R, 20G and 20B, respectively. The laser beams 15R, 15G and 15B reflected by the reflecting mirror 36 inside the housing 40 emanate the housing 40 through the light outlet window 44 formed on the side wall of the housing 40 toward the sub-scanning section 50 outside the housing 40.

The sub-scanning section 50 comprises an exposing drum 52 which can be rotated in both the regular direction and the reverse direction, and a pair of driven nip rollers A154 and 56 which press the photosensitive material A against the exposing drum 52 on opposite sides of the main scanning line SL. At least during scanning for one image, the exposing drum is rotated in the regular direction to convey the photosensitive material A in the sub-scanning direction with the photosensitive material A in a continuous length nipped between the nip rollers 54 and 56 and the exposing drum 52.

The starting point control in the main scanning will be described, hereinbelow. Since the laser beams 15R, 15G and 15B emitted from the lasers 14R, 14G and 14B impinge upon a point on the photosensitive material A one after another, they impinge upon different points spaced from each other in the main scanning direction at a given time. Accordingly when the lasers 14R, 14G and 14B are turned on simultaneously, the laser beams 15R, 15G and 15B modulated according to an image signal component for one pixel cannot impinge upon the photosensitive material A at the same point but impinge upon the photosensitive material A at three different points spaced from each other in the main scanning direction, which results in color displacement in the recorded color image.

Figure 3:
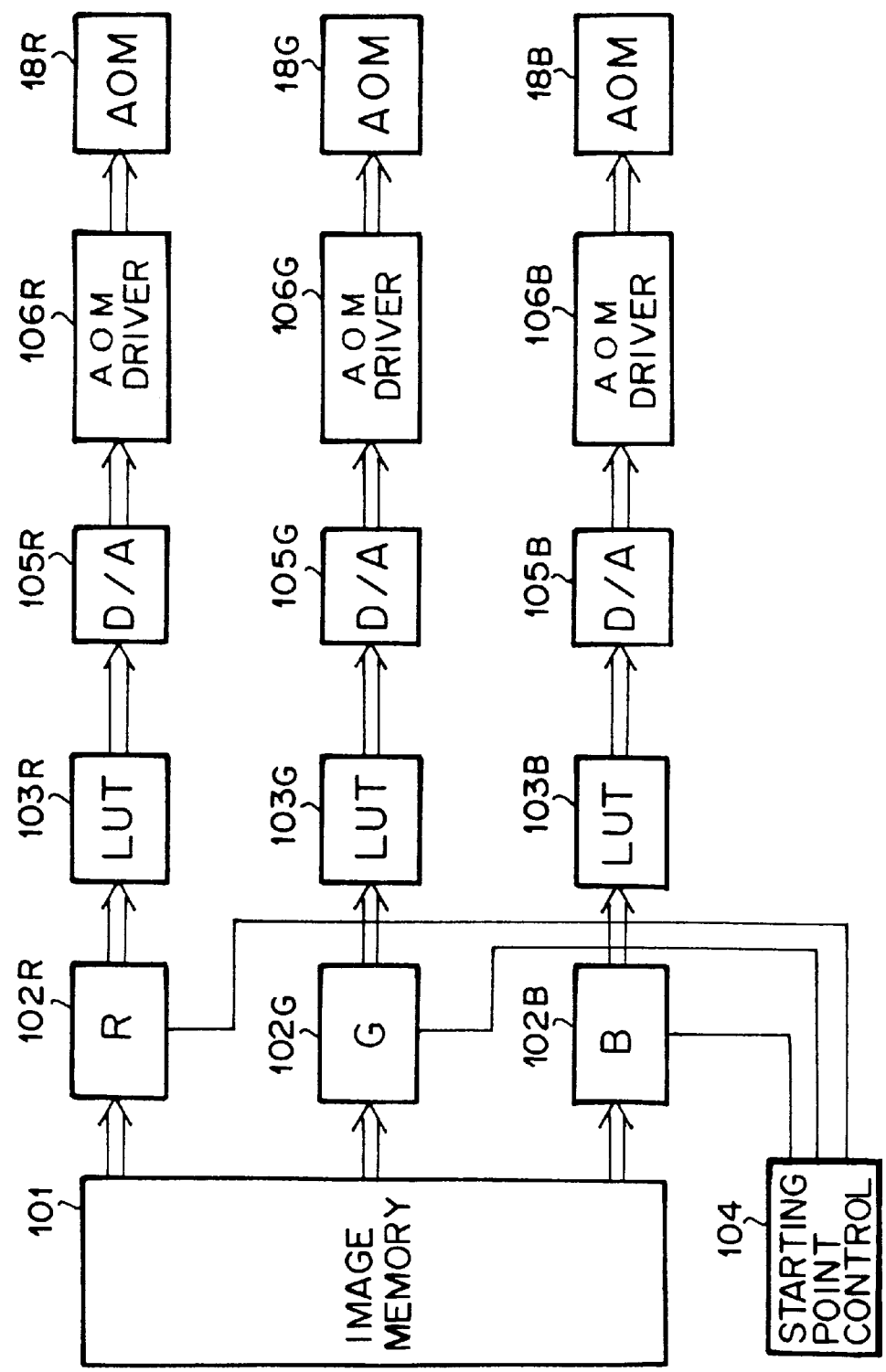
FIG. 3 is a block diagram of the electric circuit of the color image recording system.

In order to prevent such color displacement, an AOM control system shown in FIG. 3 for controlling the AOMs 18R, 18G and 18B is provided with a starting point control means 104. The AOM control system shown in FIG. 3 comprises an image memory 101 which stores three color image signals, buffer memories 102R, 102G and 102B which temporarily stores the image signals of the respective colors read out from the image memory 101, lookup tables (LUT) 103R, 103G and 103B which determine the values of AOM drive signals corresponding to the image signals of the respective colors read out from the buffer memories 102R, 102G and 102B, D/A convertors 105R, 105G and 105B which convert the values of AOM drive signals to analog values and AOM drivers 106R, 106G and 106B which apply voltages corresponding to the analog values of the drive signals to the AOMs 18R, 18G and 18B.

Figure 4:
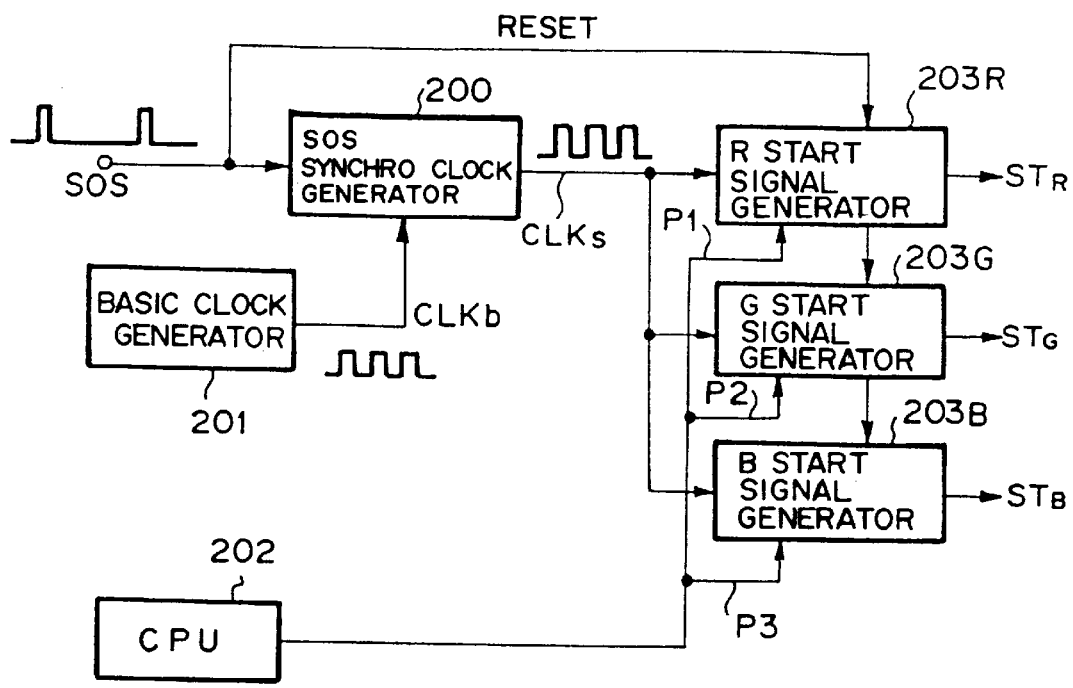
FIG. 4 is a block diagram showing a part of the electric circuit shown in FIG. 3.

The starting point control means 104 determines the timings at which the AOMs 18R, 18G and 18B start to modulate the laser beams 15R, 15G and 15B by controlling the timing at which the image signals are read out from the buffer memories 102R, 102G and 102B, whereby the recording start points of the laser beams 15R, 15G and 15B is controlled. As shown in FIG. 4, the part of the starting point control means 104 which effects this control comprises a SOS (start of scan) synchronization clock signal generator 200 into which a starting point detecting signal SOS is input, a basic clock generator 201 which inputs a basic clock CLKb at a predetermined frequency into the SOS synchronization clock signal generator 200, a CPU 202, a R start signal generator 203R, a G start signal generator 203G and a B start signal generator 203B.

The starting point detecting signal SOS is a pulse signal which is obtained, for instance, by passing through a waveform shaper a signal output from the starting point sensor 38 each time it detects the laser beam 15R. The SOS synchronization clock signal generator 200 generates a SOS synchronization clock CLKs which is obtained by synchronizing the basic clock CLKb with the starting point detecting signal SOS and inputs the SOS synchronization clock CLKs into the R start signal generator 203R, the G start signal generator 203G and the B start signal generator 203B.

Figure 5:
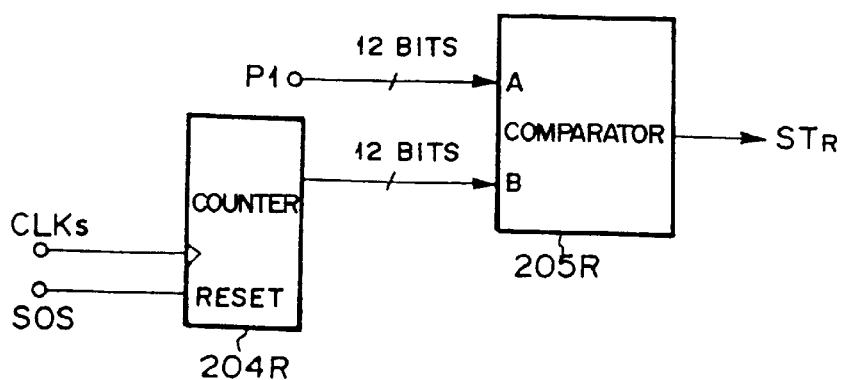
FIG. 5 is a block diagram showing a part of the electric circuit shown in FIG. 4.
Figure 6:
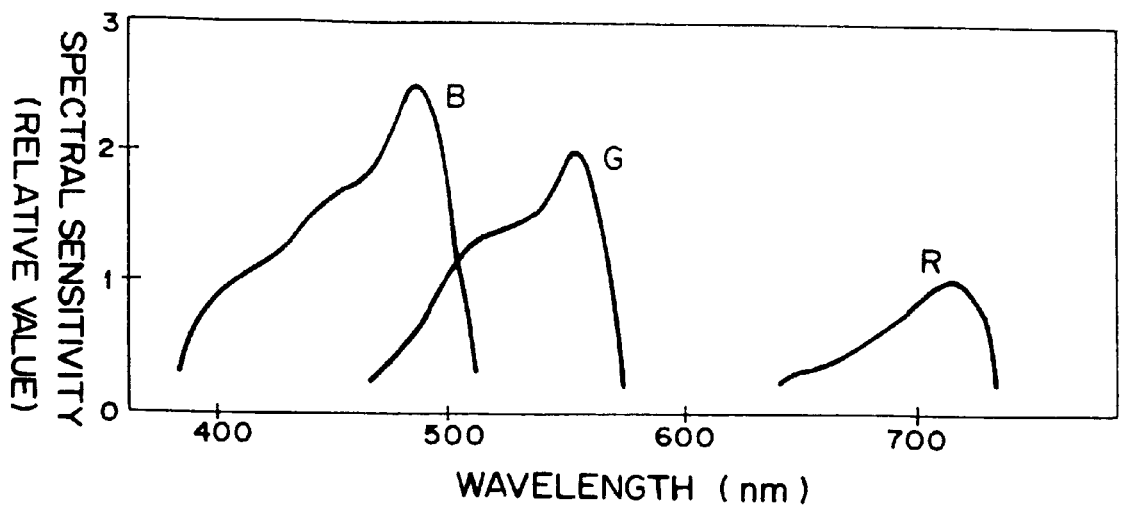
FIG. 6 is a graph showing the spectral sensitivity of an example of the color photosensitive material employed in this embodiment.
Figure 7:
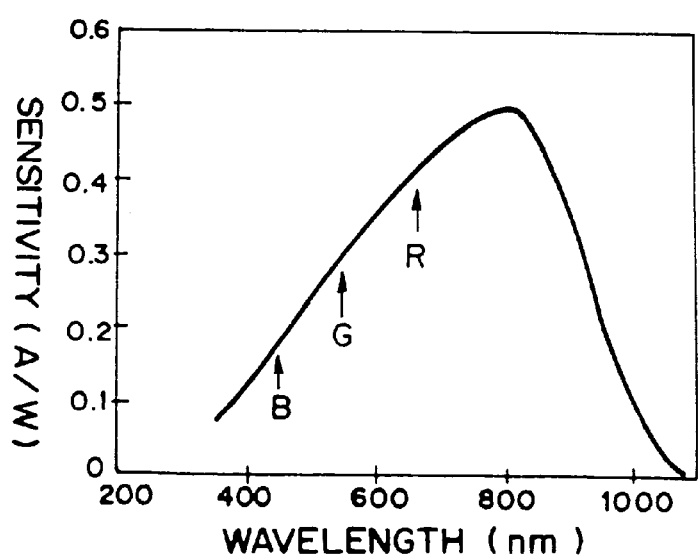
FIG. 7 is a graph showing the spectral sensitivity of an example of the photodetector.

The R start signal generator 203R generates a R start signal STR when it counts a predetermined number N1 of clocks CLKs and inputs it into the starting point control means 104. As shown in FIG. 5, the R start signal generator 203R comprises a counter 204R which is reset by the starting point detecting signal SOS and counts the SOS synchronization clock CLKS, and a comparator 205R into which the counts of the counter 204R is input. The comparator 205R outputs a R start signal STR when the counts of the counter 204R becomes equal to the predetermined number N1 of clocks CLKs represented by a set signal P1 input from the CPU 202.

The G start signal generator 203G and the B start signal generator 203B are of the same structure as the R start signal generator 203R. The G start signal generator 203G generates a G start signal STG when it counts a predetermined number N2 of clocks CLKs and inputs it into the starting point control means 104. The B start signal generator 203B generates a B start signal STB when it counts a predetermined number N3 of clocks CLKs and inputs it into the starting point control means 104. The predetermined numbers N2 and N3 are set by set signals P2 and P3 input from the CPU 202, and N1<N2<N3.

The starting point control means 104 causes the AOMs 18R, 18G and 18B to start to modulate the laser beams 15R, 15G and 15B upon receipt of the R start signal STR, the G start signal STG and the B start signal STB, respectively. With this arrangement, each time the starting point sensor 38 detects the laser beam 15R and generates the starting point detecting signal SOS, the laser beams 15R, 15G and 15B start recording respectively predetermined times T1, T2 and T3 (T1<T2<T3) after the time the starting point sensor 38 detects the laser beam 15R.

By properly empirically setting the times T1, T2 and T3 (the counts N1, N2 and N3), the laser beams 15R, 15G and 15B modulated according to three color image signals for a pixel can accurately impinge upon the same point on the photosensitive material A, whereby occurrence of color displacement in the recorded image can be prevented.

Figure 8:
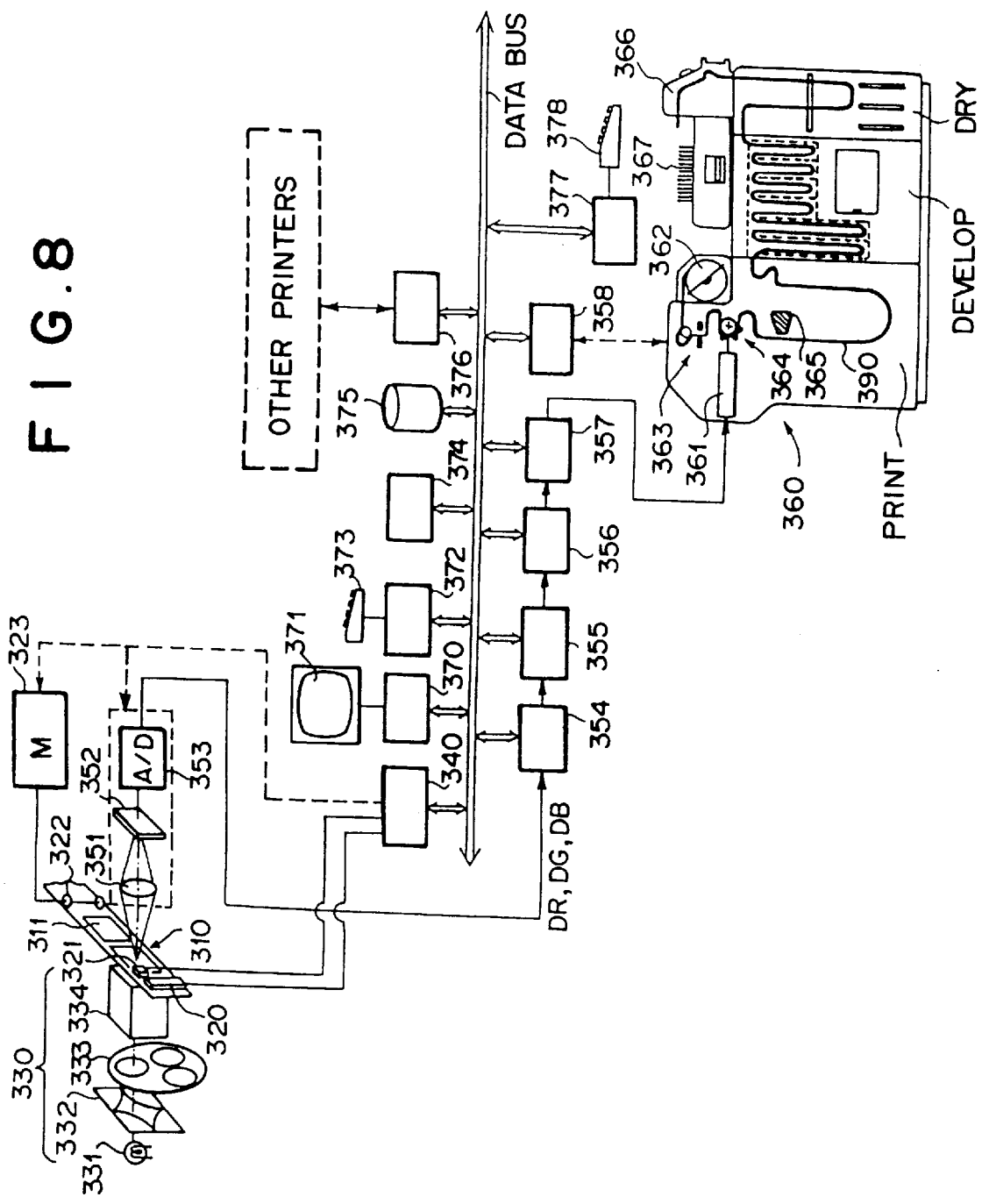
FIG. 8 is a schematic view of a color image recording system in accordance with another embodiment of the present invention.

Another embodiment of the present invention will be described with reference to FIG. 8, hereinbelow. FIG. 8 shows a digital photographic printer provided with a color image recording system of the present invention. In FIG. 8, the digital photographic printer is provided with a scanner 320 which reads out a film number recorded on a check tape attached to an end of photographic film 310, a bar code reader 321 which reads out bar codes provided for each frame 311 on the photographic film 310, a sprocket 322 which is in mesh with perforations of the film 310 and is rotated to feed the film 310, a motor 323 which drives the sprocket 322, and a film scanner control interface 340 which sends the film number read by the scanner 320 and the frame numbers read by the bar code reader 321 to a data bus and outputs a motor control signal to the motor 323. The photographic printer is further provided with a light source unit 330 which comprises a light source 331 for projecting reading light onto the frames 311 of the film 310, a light control unit 332, a color separation unit 333 and a diffusion box 334, a CCD 352 which photoelectrically reads an image (transmission image) recorded on the frame 311, onto which the reading light is projected, through a lens 351, an A/D convertor 353 which converts an image signal representing the image on the frame 311 output from the CCD 352 to a digital image signal, a first image processing system 354 which carries out necessary corrections on the digital image signal output from the A/D convertor 353 and outputs a processed image signal to a frame memory 355, a second image processing system 356 which carries out an image processing, whose image processing parameters are changed as required, on the processed digital image signal stored in the frame memory 355, and a modulator driver 357 which outputs a modulation signal on the basis of the digital image signal processed by the second image processing system 356.

The photographic printer is further provided with a printer 360 which reproduces a visible image based on the modulation signal output from the modulator driver 357, a printer interface 358, a hard disk 375 which stores the digital image signal stored in the frame memory 355 by way of the data bus, a CRT monitor 371 which reproduces, as needed, a visible image based on the digital image signal and displays image processing conditions and the like, a display interface 370, a keyboard 373 for inputting image processing conditions, correction values for the image processing conditions, an image retrieval information and the like, a keyboard interface 372, a CPU (central processing unit) 374, a communication port 376 which is connected to other digital photographic printer systems through a communication line, a keyboard 378 which is disposed in a check section for checking photographic prints reproduced by the printer 360 and is for inputting, as needed, a reprint instruction and a keyboard interface 377. The CPU 374 carries out mapping of the image retrieval information including the film number and the frame numbers read by the scanner 320 and the bar code reader 321, the image processing conditions input from the first image processing systems 354 and the digital image signal input from the frame memory 355 and then stores them in the hard disk 375 by way of the data bus. Further the CPU 374 retrieves from the data bus a digital image signal corresponding to image retrieval information input from the keyboard 373 and controls it, and controls the instruments connected to the data bus.

The printer 360 comprises a printing section, a developing section and a drying section. The printing section comprises a magazine 362 which stores a roll of photographic paper 390 in a continuous length, an exposing light scanner 361 which modulates exposing light according to the modulation signal output from the modulator driver 357 and causing the modulated exposing light to scan the photographic paper 390 in a main scanning direction, a hole punch unit 363 which punches out reference holes in the photographic paper 390 for positioning the photographic paper 390, a sub-scanning drive system 364 which feeds the photographic paper 390 in the longitudinal direction thereof (sub-scanning) on the basis of the reference holes, and a back printing unit 365 which records the image retrieval information input through the printer control interface 358 on the back side of the photographic paper 390.

The drying section comprises a cutter 366 which cuts the exposed photographic paper 390 exposure by exposure after drying and a sorter 367 which arranges in order the prints thus cut from the exposed photographic paper 390 in a continuous length.

Operation of the digital photographic printer will be described, hereinbelow.

The motor 323 is first driven by the CPU 374 by way of the film scanner control interface 340, and the film 310 carrying thereon a plurality of exposures is fed by the sprocket 322. While the sprocket 322 is feeding the film 310, the scanner 320 reads the film number on the check tape and inputs it into the CPU 374. Similarly the bar code reader 321 reads the frame number and inputs it into the CPU 374 by way of the film scanner control interface 40.

Light emitted from the light source unit 330 is projected onto the exposure 311 and an image recorded on the exposure 311 is formed on the CCD 352 through the lens 351.

The CCD 352 reads the image formed thereon and photo-electrically converts it into an image signal representing the image on the exposure 311. The output signal of the CCD 352 is digitized by the A/D convertor 353, whereby a digital image signal made up of digital image signal components for the respective pixels is obtained.

At this time, red, green and blue filters of the color separation unit 333 are inserted in sequence into the path of the light emitted from the light source 331 and the image is read for each color filter. Accordingly the A/D convertor 353 outputs red, green and blue digital image signals DR, DG and DB each made up of digital image signal components representing densities of each color for pixels.

The first image processing system 354 carries out an inversion processing on the digital image signals DR, DG and DB input when they are obtained from a negative and then carries out, on the image signals, an image processing according to a predetermined image processing algorithm so that when a visible image is reproduced on a photographic paper by use of the processed image signals DR, DG and DB, optimal density, gradation, color and sharpness can be obtained. Then the first image processing system 354 outputs the processed image signals to the frame memory 355.

The image signals input into the frame memory 355 are once stored therein and at the same time are input into the CPU 374 through the data bus, which enables the CPU 374 to optimally adjust the dynamic range of the CCD 352 and the like and optimally adjust the amount of light projected onto the film from the light source unit 330 on the basis of the image signals so that the image read out is optimal in density and gradation.

The image signals stored in the frame memory 355 is input into the CRT monitor 371 through the data bus and a visible image is displayed on the CRT monitor 371 on the basis of the image signals. Then the operator can input through the keyboard 373 correction values for correcting the image processing conditions so that a visible image optimal in density, gradation, color and sharpness can be obtained.

The correction values input through the keyboard 373 are input into the second image processing system 356. The second image processing system 356 carries out an image processing according to the correction values on the image signals stored in the frame memory 355 and outputs the processed image signals to the modulator driver 357. When the correction is not necessary, the second image processing system 356 outputs the image signals stored in the frame memory as they are to the modulator driver 357.

The printer 360 is controlled by the CPU 374 through the printer control interface 358. That is, the sub-scanning drive system 364 first feeds the photographic paper 390, extending along a predetermined path from the magazine 362, in the sub-scanning direction. The hole punch unit 363 provided on the path of the photographic paper 390 punches out reference holes for synchronization in a side edge portion of the photographic paper 390 at intervals corresponding to, for instance, a length of one photographic print. In the printer 360, the photographic paper 390 is fed with the reference holes used as a reference of synchronization.

The photographic paper 390 is scanned by light beams of three colors emitted from the exposing scanner 361 and modulated according to the image signals while being fed in the sub-scanning direction, whereby a visible image is recorded on the photographic paper 90 according to the image signals. The speed at which the photographic paper 390 is fed is controlled by the CPU 374 so that the main scanning and the sub-scanning are synchronized with each other.

Thereafter the photographic paper 390 is fed to the developing section from the printing section along a predetermined path. After developed and washed in the developing section, the photographic paper 390 is fed to the drying section. In the drying section, the photographic paper 390 is dried and cut into prints by the cutter 366.

In the printer 360, a starting point control is carried out as in the embodiment shown in FIG. 1, whereby occurrence of color displacement in the color image reproduced on the photographic paper 390 is prevented.

What is claimed is:

1. A color image recording system in which a color image is recorded on a photosensitive material by causing first to third color light beams of red, green and blue light respectively to be modulated according to a color image signal to scan the photosensitive material one after another in the order of the first to third color light beams, the color image recording system comprising:

a photodetector which detects only the first color light beam, and a starting point control means which causes the first to third color light beams to start recording of the image at respective predetermined times T1, T2 and T3 (T1<T2<T3) after receipt of a beam detection signal from the photodetector.

2. A color image recording system as defined in claim 1 in which the starting point control means varies the predetermined times T1, T2 and T3.

3. A color image recording system comprising:

a plurality of light sources which emit red, green and blue light beams to scan a photosensitive material, wherein the photosensitive material is scanned in order by the red, green and blue light beams respectively, and a photodetector which detects only the red light beam to start recording of an image on the photosensitive material at respective predetermined times T1, T2 and T3 (T1<T2<T3) after the photodetector detects the red light beam, thereby preventing color displacement in the recorded image.

4. The color image system according to claim 3, wherein the plurality of light sources are lasers.

5. The color image system according to claim 3, wherein the red, green and blue light beams are modulated according to a color image signal to scan the photosensitive material in the respective red, green and blue light beam order.

6. A color image system according to claim 3, further including a starting point control means which receives a detection signal from the photodetector to initiate recording of the image at respective predetermined times T1, T2 and T3.

7. A color image system according to claim 6, wherein the starting point control means varies the predetermined times T1, T2 and T3.

8. A method of recording a color image in a digital photoprinter, comprising the steps of:

emitting red, green and blue light beams from a plurality of light sources;

scanning a photosensitive material with the light beams, wherein the photosensitive material is scanned in order by the red, green and blue light beams respectively, and detecting only the red light beam with a photodetector, wherein the detection of the red light beam initiates recording of an image on the photosensitive material at respective predetermined times T1, T2 and T3(T1<T2<T3), thereby preventing color displacement in the recorded image.

9. The method according to claim 8, wherein the step of emitting is performed by a plurality of lasers.

10. The method according to claim 8, further comprising the step of modulating the red, green and blue light beams according to a color image signal, thereby providing the respective red, green and blue light beam order.

11. The method according to claim 8, wherein the step of detecting further includes employing a starting point control means for receiving a detection signal from the photodetector to initiate the recording of the image at respective predetermined times T1, T2 and T3.

12. The method according to claim 11, wherein the starting point control means varies the predetermined times T1, T2 and T3.

* * * * *